Figure 1:
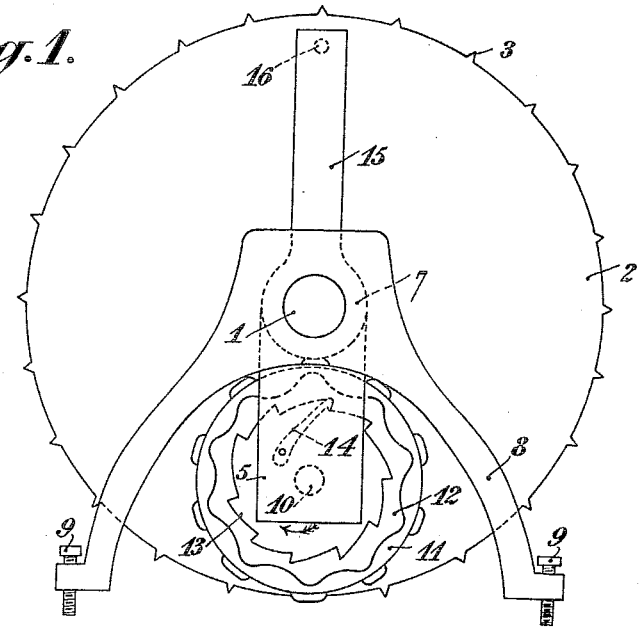

P. L. V. SCHULSTAD.
APPARATUS FOR MEASURING AND SIMULTANEOUSLY MARKING THE MEASUREMENTS ON MACHINE BELTS AND THE LIKE.
APPLICATION FILED MAY 16, 1917.

1,309,306.
Patented July 8, 1919.

Inventor
Peter L. V. Schulstad,
By [signature]
Atty.

THE COLUMBIA PLANOGRAPH CO., WASHINGTON, D. C.

UNITED STATES PATENT OFFICE.

PETER LUDVIG VILHELM SCHULSTAD, OF COPENHAGEN, DENMARK.

APPARATUS FOR MEASURING AND SIMULTANEOUSLY MARKING THE MEASUREMENTS ON MACHINE-BELTS AND THE LIKE.

1,309,306.  Specification of Letters Patent.  Patented July 8, 1919.

Application filed May 16, 1917. Serial No. 169,073.

*To all whom it may concern:*

Be it known that I, PETER LUDVIG VILHELM SCHULSTAD, of No. 4 Blegdamsvej, Copenhagen, in the Kingdom of Denmark, have invented certain new and useful Improvements in Apparatus for Measuring and Simultaneously Marking the Measurements on Machine-Belts and the like; and I do hereby declare the following to be a full, clear, and exact description of the invention such as will enable others skilled in the art to which it appertains to make and use the same, reference being had to the accompanying drawings, and to letters or figures of reference marked thereon, which form a part of this specification.

There are various already known apparatus for marking cloth, paper, and like materials with different marks of measurement, partly to indicate certain units of measurement, and partly for marking the number of length units measured at certain periods of time. Such apparatus are generally driven by the strip of material to be marked being passed around a measuring drum which actuates the marking apparatus either directly or by means of suitable cog-wheel gears; and it is a feature in common for all these apparatus that they are driven mechanically, so that the accuracy of the measurement and the marking depends on the accuracy of the mechanical driving means.

The known apparatus are not suitable for measuring and marking belts of leather, or the like, partly because the width of the belts varies so greatly, and partly because these apparatus do not produce durable markings, and the measurement is not accurate.

Hitherto the belting has generally been measured at the same time that it is rolled up into rolls. Since the belt, during the process of rolling-up, is tightly stretched and therefore, after the rolling-up is completed, contracts or shrinks more or less, contentions may arise between seller and buyer with respect to the measurement. Furthermore, there is often too great waste in cutting off lengths from a roll of belting, partly because a measurement by hand is liable to be inaccurate, and partly because the belting will stretch during use.

According to the present invention it is sought to obviate these disadvantages by using, for the measurement of the belt stretched during the process of rolling-up, a disk furnished, on its periphery, with measurement-gradations, and eventually with numbers, in the form of teeth or knives, said disk being driven by a belt passing between the periphery of the disk and an underlay, or pad, whereby the belt, at the same time that it is measured, is marked with measurement-units by the teeth or the disk cutting into the belt. The disk carries an eccentric counting-device (of a kind already known), which runs in a bearing disposed on one of its lateral surfaces, the teeth of which counting-device contribute to keep the marking-disk rotating.

Figure 2:
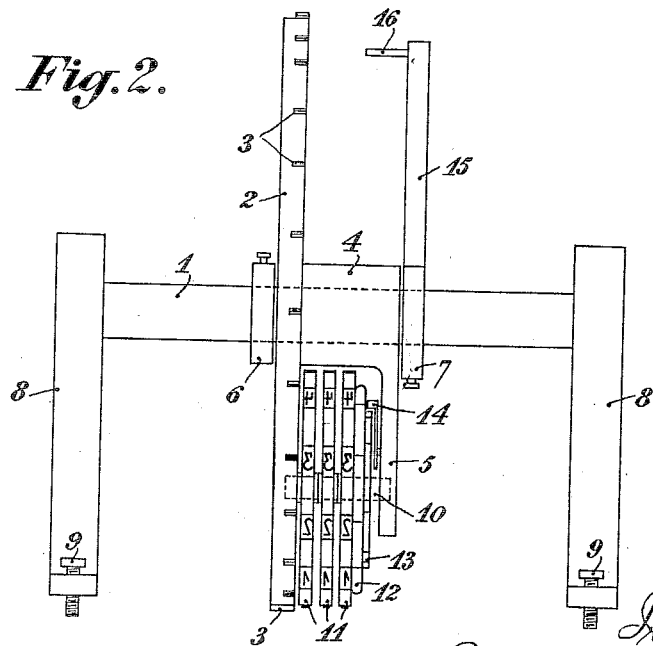

In the accompanying drawing, Figure 1 is a side-view of one form of construction of the apparatus. Fig. 2 is a front view of the same.

On a shaft 1 there is revolubly journaled a cylindrical disk 2, which on its periphery has a number of projecting markers 3 in the form of teeth, or knives, which markers may have different lengths, and, in order to facilitate the reading of the measurement-gradations made by these markers, numbers may be disposed opposite certain markers on the periphery of the disk. The markers 3, which are at an equal distance from one another, are disposed with their outer edges on a circle whose periphery is equal to a large, suitable measurement-unit, *e. g.*, a meter (or yard), while the relative distance between the markers is, *e. g.* four centimeters (or one inch).

The shaft 1 is journaled in trestles 8 with feet, the latter being provided with setscrews 9 to facilitate the adjustment of the marking-disk to the desired height above the underlay, or pad, on which the belt rests, this height depending upon the thickness of the belt and the pressure to be exercised upon the belt in order to make plain and clear marks on it. The screws 9 also serve to hold the apparatus securely on the underlay over which the belt slides during the process of measuring and marking. Furthermore, the shaft 1 may be adjustably journaled in the trestles and may be actuated by a spring or springs, so that the disk 2 is held against the belt with a resilient pressure.

In the form of construction shown in Figs. 1 and 2, there is journaled, on one of the lateral surfaces of the disk 2, one end of a shaft 10, the other end of which is journaled in an arm 5 projecting from the nave 4 of the disk.

On the shaft 10 there is revolubly disposed a counting device consisting of three counting-disks 11 whose numbers are disposed on a circle whose projection on the circle formed by the markers 3 touches the latter circle at a point opposite the marker 3 which indicates the zero-mark on the marking-disk. Thus the number adjusted on the counting-disks will be pressed into the belt simultaneously with the zero-mark, or once during each revolution of the marking-disk, and in this manner the counting-device marks the total number of revolutions which have been made by the marking-disk, while the markers 3 indicate fractions of a revolution.

The counting-device, which is of known construction, and is therefore only shown diagrammatically, is adjusted in such a manner that the unit counting disk is connected with a cog-wheel 12, which, in its turn, is connected with a ratchet-wheel 13, into which there normally meshes a resilient ratchet pawl 14 pivoted on the arm 5. During each revolution of the marking-disk 2 one of the cogs of the cog-wheel 12 engages a pin 16, which is fast disposed on the frame of the apparatus, e. g., on the arm 15, which extends from one of the stop-disks 6 and 7 between which the disk 2 revolves. Thereby the cog-wheel, and consequently the unit counting-disk, are turned forward far enough to adjust the next number in due time before the impression is to be made.

I claim:—

1. In an apparatus for measuring and marking machine-belts and the like, a rotatable marking disk having equidistant marking members on the periphery thereof adapted to engage the traveling belt, the hub of the disk having an arm extending in a plane parallel to the latter, in combination with a counting mechanism comprising a shaft extending between and mounted in the disk and arm, a plurality of counting disks journaled on the shaft, each counting disk having a series of numbers adapted to be successively brought by rotation into the plane of the zero mark on the marking disk, and means whereby the counting disks receive their rotating movement from the marking disk during the movement of the belt.

2. In an apparatus for measuring and marking machine belts and the like, a rotatable marking disk, a plurality of equidistant marking knives mounted on the periphery of the disk adapted to engage and mark the traveling belt, said knives being disposed at intervals to maintain one of them always in contact with the belt, an arm on the hub of the disk extending parallel to the latter, a shaft extending between and mounted in the disk and arm, a plurality of counting disks rotatably mounted on the shaft, each counting disk having a series of numbers adapted to be successively brought by rotation in register with the knife in contact with the belt and engage and mark the latter, and means whereby the counting disks receive their rotating movement from the marking disk at each revolution of the latter during the movement of the belt.

In testimony that I claim the foregoing as my invention, I have signed my name.

PETER LUDVIG VILHELM SCHULSTAD.

Copies of this patent may be obtained for five cents each, by addressing the "Commissioner of Patents, Washington, D. C."